Figure 1:
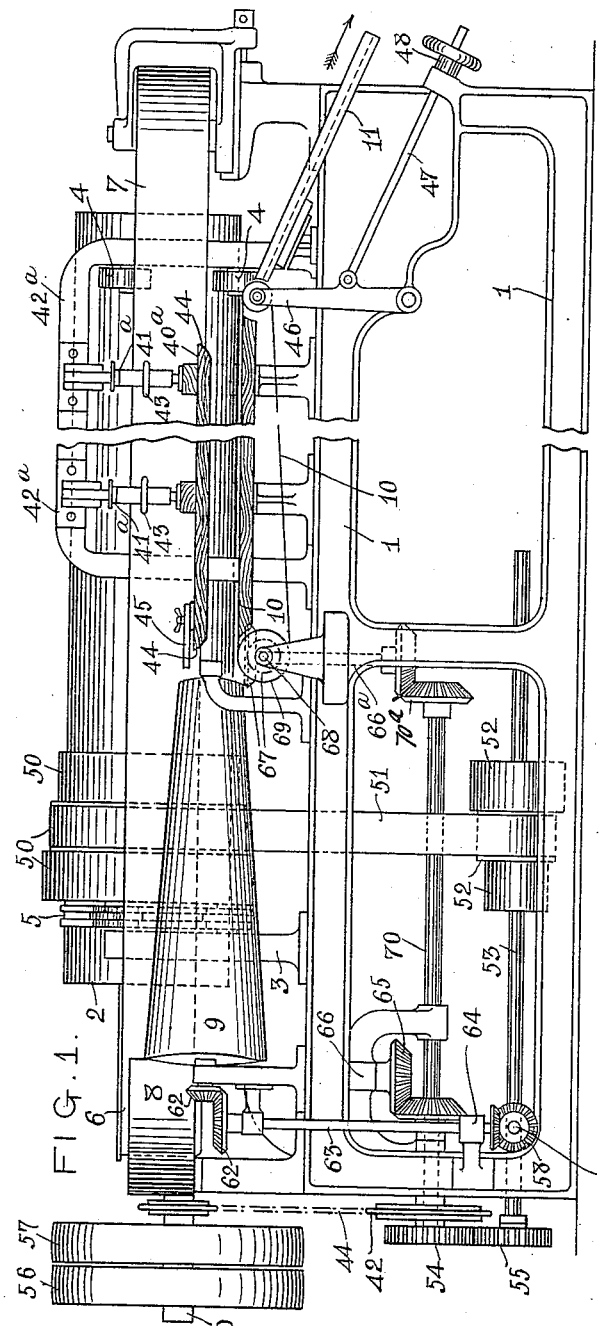

G. S. BAKER & J. CALLOW.
DOUGH MOLDING APPARATUS.
APPLICATION FILED APR. 6, 1909.

1,007,665.

Patented Nov. 7, 1911.

4 SHEETS—SHEET 3.

Witnesses:

Inventors
George Samuel Baker
John Callow
by
Attorney

G. S. BAKER & J. CALLOW.
DOUGH MOLDING APPARATUS.
APPLICATION FILED APR. 6, 1909.

1,007,665.

Patented Nov. 7, 1911.
4 SHEETS—SHEET 4.

Witnesses:

Inventors
George Samuel Baker
John Callow
by
Attorney

UNITED STATES PATENT OFFICE.

GEORGE SAMUEL BAKER, OF LONDON, AND JOHN CALLOW, OF LIVERPOOL, ENGLAND.

DOUGH-MOLDING APPARATUS.

1,007,665.

Specification of Letters Patent. Patented Nov. 7, 1911.

Application filed April 6, 1909. Serial No. 488,237.

*To all whom it may concern:*

Be it known that we, GEORGE SAMUEL BAKER, a subject of the King of England, residing at Willesden Junction, London, N. W., and JOHN CALLOW, a subject of the King of England, residing at Anfield, Liverpool, both in England, have invented certain new and useful Improvements in Dough-Molding Apparatus, of which the following is a specification.

This invention relates to improvements in dough molding apparatus more particularly of the class described in the specification of prior Patent No. 833,824, dated October 23, 1906, which describes a trough in which lumps of dough or like plastic material are fed, one side of said trough being formed by a conveyer, and the other side by a continually rotating roller or rollers, whereby the rollers rotating and the conveyer traveling tend to constantly feed the lumps of dough and pull the outer skin thereof downward toward the narrow bottom of the trough, and fold the dough. In this construction the exterior surface of the roller acts upon the dough.

The primary object of this is to provide a hollow roller or rollers with the endless traveling conveyer or carrier located so as to pass through the interior of the said roller or rollers, in such manner that the internal surface of the roller in rotating, and the conveyer in traveling through it will so act upon the dough, as to set up a combined folding, rolling and squeezing action on all sides.

Another object is to provide internal molding rollers or drums at one side of the machine and external molding rollers or drums at the other side of the machine, with a carrier or conveyer running on the inner side of the one roller or rollers and on the outer side of the other roller or rollers to form the molding troughs.

Another object is to provide a roller or scraper or roller and scraper combined, at the edge of the conveyer for the purpose of stripping the rollers of any adhering dough, and at the same time improve the closing of the dough.

Another object of the invention is to provide means by which the lumps of dough which are usually of peg top or inverted cone shape can be so treated as to be converted into the prismatic or cylindrical form desirable for the making of thin or elongated loaves.

Another object is to provide a board, plate or equivalent having means for its angular displacement to enable the pressure between the co-acting surfaces of the conveyer and cylinder to be varied as required within certain limits.

Another object is to provide said board with curved projections or enlargements at certain points in its length for the purpose of producing corresponding swellings in the conveyer which cause the passage between the conveyer and cylinder surface to be constricted at such points thus causing greater pressure to be exerted on the substance at the points where such projections occur.

Another object is to provide within the molding roller a reciprocating or oscillating plate or member adapted to act on the substance as it emerges from said cylinder to impart a series of blows or "pats" thereto for the purpose of stretching the skin and compacting the substance, and a further object is to provide a novel form of cutting or dividing means acting in conjunction with the feed belt this device comprising a stationary but adjustable knife to separate the lump into two or more parts and means for retarding one or certain of said parts so that they are fed in succession into the trough.

An embodiment of the invention is shown in the accompanying drawings.

Figure 2:
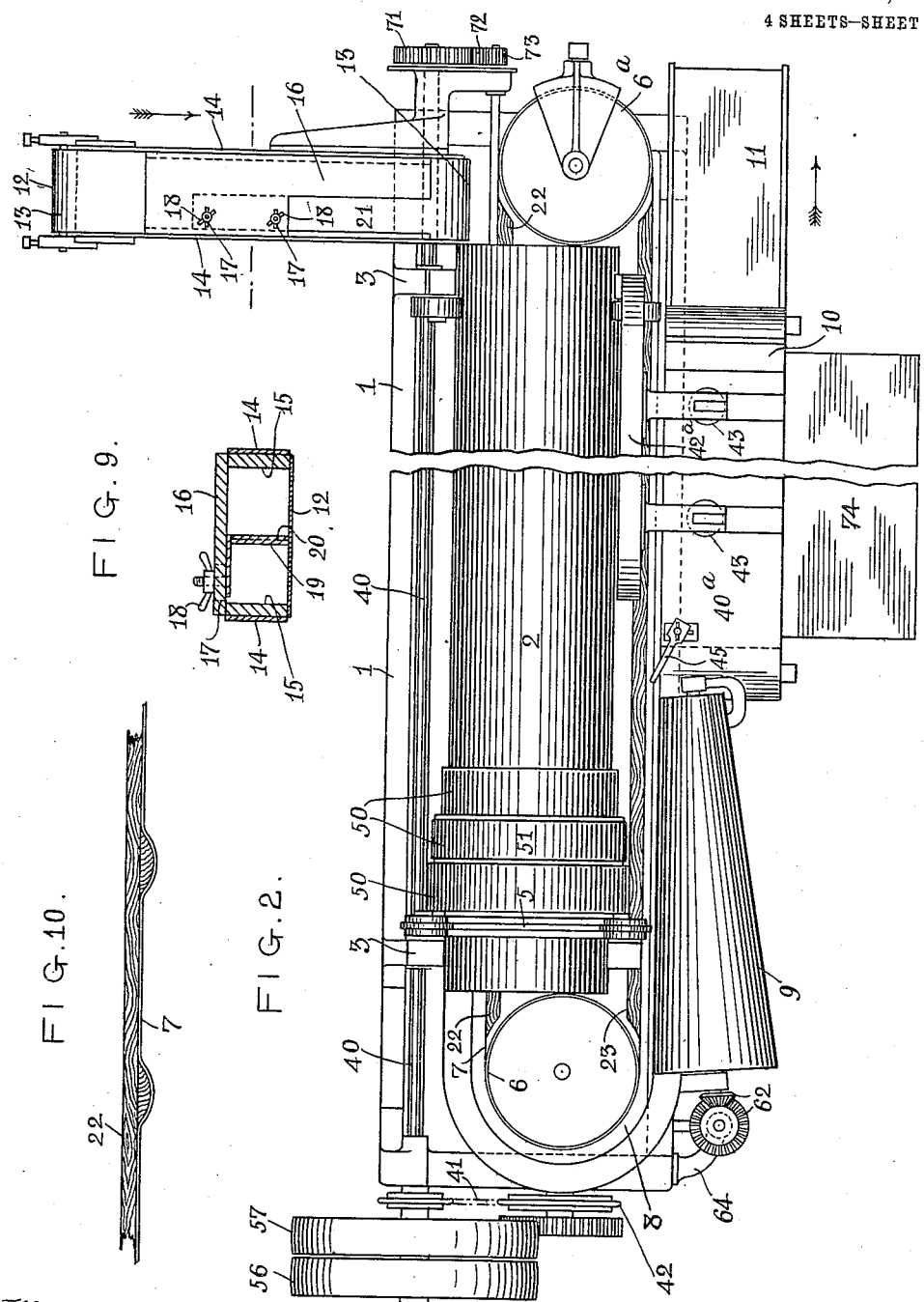
Figure 3:
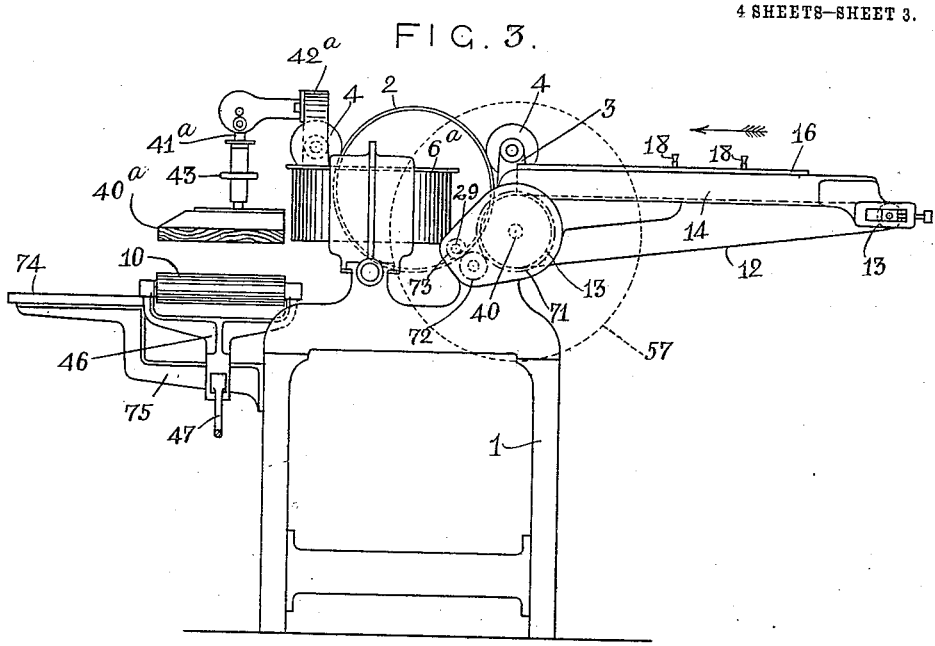
Figure 4:
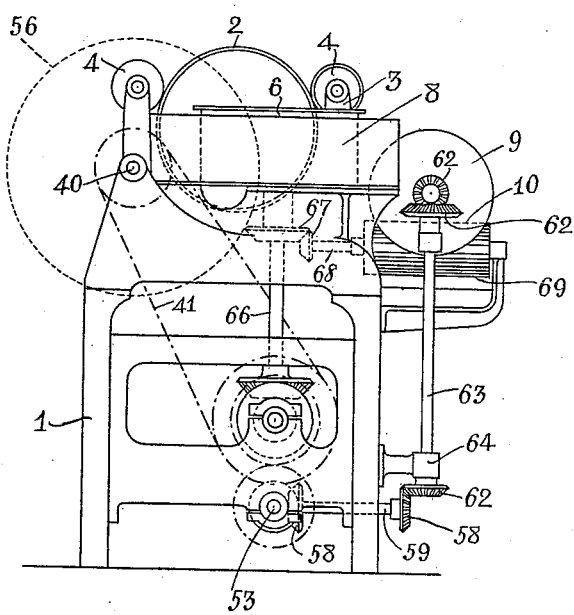
Figure 5:
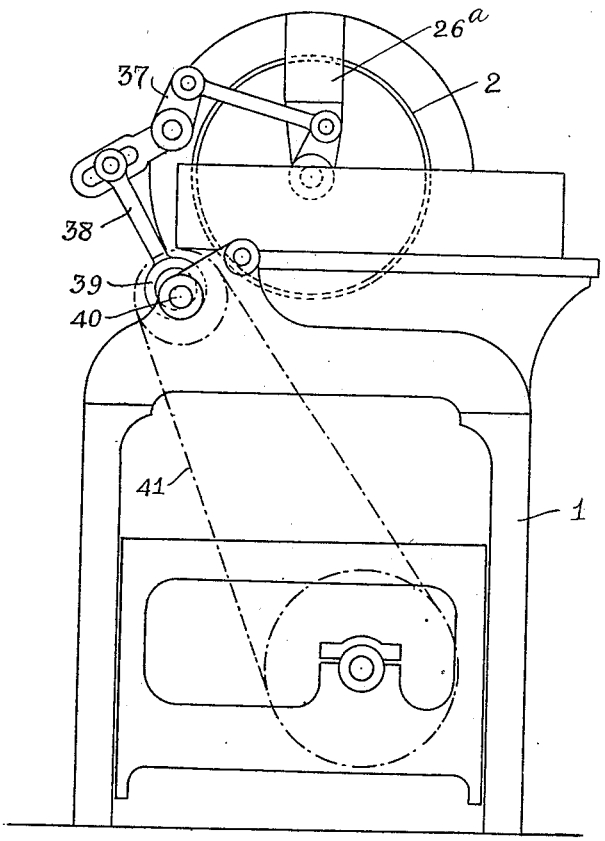
Figure 6:
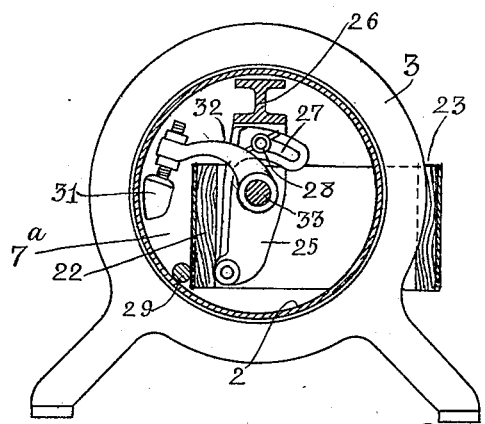

Figure 1 is a side elevation of a molding machine having both an internal molding roller or cylinder and an external roller, the latter being of tapered or conical form; Fig. 2 is a plan view of the structure shown in Fig. 1; Fig. 3 is an elevation of the right hand end of the machine as shown in Fig. 1, with certain parts omitted for clearness of illustration; Fig. 4 is an elevation of the left hand opposite end of the machine, also having certain parts omitted; Fig. 5 is an end elevation similar to Fig. 4, but showing only certain details of construction for the operation of a pressure or compacting device; Fig. 6 is a detail sectional elevation of the internal molding roller showing said pressure or compacting device, and means for angularly adjusting the support for the conveyer belt; Fig. 7 is a detail sectional elevation showing the means for mounting the internal molding roller; Fig. 8 is a detail sectional view showing the stripping roller and scraper; Fig. 9 is a cross-section on the line 9—9 of Fig. 2, and Fig. 10 is a detail view showing a modification of the conveyer belt support.

The frame 1 of the machine supports in a rotatable manner the cylinder 2 by means of the brackets 3 provided with anti-friction rolls or wheels 4, the latter at one end of the cylinder engaging peripheral grooves 5 to prevent lateral movement of the cylinder.

The conveyer 7 is carried by pulleys 6, 6$^a$ disposed in horizontal planes and one portion or run of said conveyer passes through the interior of the cylinder 2 from end to end, and adjacent one side thereof, to form the trough 7$^a$, in which the pressing, molding and squeezing action takes place. The other portion or run of said conveyer after passing around the end pulley 6, adjacent which is located a stationary trough 8, coacts with the external periphery of a conical roller 9 to further treat the dough after which it falls on to the delivery belt 10 from which it may be removed as desired or pass to an inclined board or chute 11.

The feed mechanism we prefer to employ is shown more particularly in Figs. 2 and 9 and comprises an endless belt 12 mounted on rollers 13 and disposed in a horizontal plane transversely to the axis of the cylinder 2. At each side of the belt are guide plates 14 forming a trough or channel which is lined at the sides with wooden or similar boards 15 and provided with a covering board or plate 16.

A stationary blade or cutter 19 has a sharpened edge 20 adapted to lie in the path of the lump of dough carried along on the belt 12, so that the dough is divided into two pieces which pass along on opposite sides of the knife. The covering board 16 is cut away for a portion of its length and width as at 21 whereby that lump of dough adjacent this cut away portion is freed from resistance and is fed to the opening of the cylinder at the same speed as the travel of the belt 12 whereas the other portion still covered by the board 16 is retarded and is fed more slowly, thus affording the desired degree of separation between the pieces of dough fed to the single trough 7$^a$. By adjusting the knife in relation to the top board the relative sizes of the pieces of dough may be varied according to the capacity of the feed device. This device is useful in making what is known as cottage loaves in which each loaf is made of two separate pieces of dough stuck together.

Both runs of the conveyer 7 bear upon boards 22, 23 in a well known manner and either or both of these boards may be made angularly adjustable for the purpose of varying the pressure between the co-acting surfaces of the conveyer and cylinder. Fig. 6 shows the board within the cylinder 2 arranged in this manner, the desired effect being produced by mounting the board on a rockable frame 24 pivoted at 24$^a$ in plates 25 carried by a beam 26, supported by plates 26$^a$ (Fig. 5), and extending longitudinally of the cylinder 2, and said frame being capable of angular adjustment by means of the slotted portion 27 and nut 28. This figure and also Fig. 8 show the stripping roller or rod 29 which extends throughout the length of the cylinder in contact with the interior surface thereof and if required a scraper 30 may be provided adapted to clear said roller of dough adhering thereto and prevent same from passing under the conveyer 7 and out of the trough 7$^a$ into the interior of the cylinder. Fig. 6 also shows the compacting or pressure board 31 which acts on the dough in the trough 7$^a$ and imparts a series of blows thereto to further stretch the skin and compact the substance of the dough. This board 31, the lower edge of which may be slightly tapered or reduced toward the exit end of the cylinder, is carried by arms 32, mounted on a rock shaft 33 mounted in the plates 25. The means for rocking said shaft is optional, but Fig. 5 shows as an example a crank arm 34 mounted on the shaft connected by rod 35 to one arm of a bell crank 37, the other arm of which is slotted and has connected thereto the rod 38 of an eccentric 39 mounted on the main driving shaft 40.

Above the delivery belt 10 before referred to is positioned the rolling board or guide member 40$^a$ suitably carried by arms 41$^a$ from a frame or bracket 42$^a$ extending from the main frame 1 of the machine. The length of each arm 41$^a$ is adjustable, being formed in two parts having their free ends provided with oppositely directed threads and connected by a turn buckle or sleeve 43 so that the board 40$^a$ may be moved toward and away from the belt 10. The inlet and delivery ends of the board are preferably beveled as at 44 to afford free inlet and exit for the lumps of dough and at the inlet end there is preferably mounted on the board in an adjustable manner a pivoted directing or turning finger 45, the forward end of which engages the lump of dough at its apex (the lump being usually cone-shaped as hereinbefore mentioned) and tilts the lump so that it falls base downward on the belt 10. The extension of the latter may be adjusted by mounting one of its guiding rollers in a pivoted arm 46 to which is connected an externally threaded rod 47 engaged by an internally threaded collar 48 provided with a hand wheel whereby it may be operated.

Fig. 10 shows curved enlargements or projections 22$^a$ on the board 22 for the purpose of constricting the passage between the conveyer and cylinder surface, said projections being followed approximately by the conveyer 7 in its movements thereover.

The molding cylinders or rollers, the conveyer belt, feed and delivery belts, and stripping roller may be driven in any suitable manner, for example, as shown in Fig. 1, the cylinder 2 may be driven at variable speed by the step pulleys 50 on its circumference with belt 51 and step pulleys 52 on a shaft 53, driven through gearing 54, 55, sprocket wheel 42 on shaft 70, sprocket chain 41, and the main driving shaft 40 carrying the usual fast and loose pulleys 56, 57. The conical roller 9 is driven from shaft 53 through beveled wheels 58 and 58ª, horizontal shaft 59, beveled wheels 60, 62, shaft 63, which has bearing in standards 64 extending from the main frame 1, and beveled wheels 62ª, 62ᵇ. The conveyer belt 7 is driven by means of its supporting pulleys 6, 6ª, the former of which is operated from the shaft 70 through beveled wheels 65 and vertical shaft 66 connected directly to the pulley. The delivery belt 10 is driven from shaft 70 through bevel gears 70ª, shaft 66ª, bevel wheels 67 and horizontal shaft 68 on which the supporting and driving pulley 69 of the belt is mounted. The feed belt 12 is driven directly from the shaft 40, the latter carrying one of the drums 13 on which the belt is mounted. The shaft 40 also carries a gear wheel 71 with which meshes an idle pinion 72 meshing with a pinion 73 mounted on the stripping rod 29 so that the latter is rotated in opposite direction to the roller or cylinder 2. 74 shows a convenient table adjacent the delivering belt 10 carried by brackets 75 from the frame 1.

The mode of operation is as follows:— The conveyer or carrier and the rollers or drums being set in motion, the lumps of dough are fed in at one place and are forwarded by the carrier into the interior of the hollow roller or drum. The combined actions due to the moving conveyer at one side of the trough and the opposing inner surface of the rotating roller act to constantly feed the lumps and pull the outer skin of the same downward toward the bottom of the trough, to fold the dough and draw the skin toward the " closing " of the molded piece. Thus a combined folding, rolling and squeezing action is set up, while the dough being constantly forced to rotate will receive pressure on all sides, which action will serve the purpose of molding the dough and of expelling the gases therefrom. The progression of the dough lumps continues around the conveyer guide pulley at one end of the machine, whereupon they commence to travel along the return length of the conveyer. Here they are acted upon by the molding action of the other external or internal roller or set of rollers, and the opposing surface of the carrier, and these also act to constantly feed the lumps, and pull the outer skin of the same downward toward the bottom of the trough, to fold the dough, and draw the skin toward the " closing " of the molded piece. Finally the lumps are discharged on to a table or taken away by any suitable means.

We do not limit ourselves to the particular arrangement and construction hereinbefore specified since the same may be varied within limits determined by the following claims without departing from the spirit of the invention.

What we claim as our invention and desire to secure by Letters Patent of the United States is:—

1. In a dough molding apparatus the combination with a molding roller, and a conveyer surface positioned relatively to said roller to form a trough for treatment of material, of means for feeding the material to said trough comprising a traveling surface leading to said trough, a feed channel disposed above said surface, a stationary blade adapted to divide said channel into a plurality of passages, means for adjusting said blade transversely of the channel and a covering member for said channel having a portion removed to prevent resistance to certain of the masses of material divided by the aforesaid blade.

2. In a dough molding apparatus the combination of a hollow molding roller adapted to be axially rotated, an endless conveyer belt traversing the interior of said roller in a longitudinal direction and forming a trough between said belt and the interior surface of said roller, a stationary rigid support for said belt within the cylinder, means for angular adjustment of said rigid support and spaced enlargements on said support, the contour of said enlargements being approximately followed by the conveyer belt in its movement over the same.

3. In dough molding apparatus, the combination of a hollow molding roller adapted to be axially rotated, a conveyer surface traversing the interior of said roller in a longitudinal direction and forming a trough between said surface and the interior surface of the roller; an external molding roller coacting with the conveyer surface to produce a trough between said conveyer surface and the outer surface of the roller, means for feeding material to said first mentioned trough comprising a traveling web, a feed channel disposed above said web, a stationary blade adapted to divide the channel into a plurality of passages, means for adjusting said blade transversely of the channel, and a covering member for said channel having a portion removed to prevent resistance to masses of material divided by the aforesaid blade.

4. In a dough molding apparatus, the combination of a hollow molding roller adapted to be axially rotated, a conveyer traversing the interior of said roller in a longitudinal direction and forming a trough between said conveyer and the interior surface of the roller, means for feeding material to the inlet end of said trough comprising a traveling web, a feed channel disposed above said web, a blade in said channel, means for laterally adjusting said blade transversely of the channel, a covering member for the latter having a portion removed to prevent resistance to masses of material on said web, a delivery web adjacent the exit end of the trough and a rigid stationary surface above said delivery web substantially as described.

5. In a dough molding apparatus, the combination of a hollow molding roller adapted to be axially rotated, an endless conveyer traversing the interior of said roller in a longitudinal direction and forming a trough between said conveyer and the interior surface of the roller, a stationary rigid support for the conveyer within the cylinder, means for angular adjustment of said support and means for automatically dividing and feeding masses of dough successively into the inlet end of the trough aforesaid.

In witness whereof we have signed this specification in the presence of two witnesses.

GEORGE SAMUEL BAKER.
JOHN CALLOW.

Witnesses:
H. D. JAMESON,
T. L. RAND.

---

Copies of this patent may be obtained for five cents each, by addressing the "Commissioner of Patents, Washington, D. C."